United States Patent
Bailey et al.

(10) Patent No.: US 12,275,346 B2
(45) Date of Patent: Apr. 15, 2025

(54) ROOF PANEL HAVING BIDIRECTIONAL LED FILMS

(71) Applicant: Magna Exteriors Inc., Aurora (CA)

(72) Inventors: Jeff Bailey, Troy, MI (US); Joe Struttmann, Troy, MI (US); Daniel Vander Sluis, Rochester Hills, MI (US)

(73) Assignee: MAGNA EXTERIORS, INC., Ontario, CA (US)

( * ) Notice: Subject to any disclaimer, the term of this patent is extended or adjusted under 35 U.S.C. 154(b) by 0 days.

(21) Appl. No.: 18/538,328

(22) Filed: Dec. 13, 2023

(65) Prior Publication Data
US 2024/0217424 A1 Jul. 4, 2024

Related U.S. Application Data

(60) Provisional application No. 63/435,876, filed on Dec. 29, 2022.

(51) Int. Cl.
| | |
|---|---|
| *B60Q 1/50* | (2006.01) |
| *B60Q 1/00* | (2006.01) |
| *B60Q 1/26* | (2006.01) |
| *B60Q 1/30* | (2006.01) |
| *B60Q 3/208* | (2017.01) |
| *B62D 25/06* | (2006.01) |
| *F21V 8/00* | (2006.01) |

(52) U.S. Cl.
CPC ........... *B60Q 1/503* (2013.01); *B60Q 1/0035* (2013.01); *B60Q 1/268* (2013.01); *B60Q 1/302* (2013.01); *B60Q 3/208* (2017.02); *B62D 25/06* (2013.01); *G02B 6/006* (2013.01); *G02B 6/0068* (2013.01); *G02B 6/0076* (2013.01); *G02B 6/0095* (2013.01)

(58) Field of Classification Search
CPC ........ B60Q 1/268; B60Q 1/302; B60Q 1/503; B60Q 1/2611; B60Q 3/208; B62D 25/06
See application file for complete search history.

(56) References Cited

U.S. PATENT DOCUMENTS

| | | | | |
|---|---|---|---|---|
| 4,715,649 | A * | 12/1987 | Bores | B60J 7/11 296/218 |
| 10,556,536 | B2 * | 2/2020 | Shipman | G09F 21/042 |
| 11,285,790 | B2 * | 3/2022 | van Doleweerd | B32B 1/00 |
| 11,851,106 | B2 * | 12/2023 | Huelsen | B62D 25/06 |
| 2012/0320621 | A1 * | 12/2012 | Kleo | B32B 17/1066 362/558 |

(Continued)

*Primary Examiner* — Keith G. Delahoussaye
(74) *Attorney, Agent, or Firm* — Warn Partners, P.C.

(57) ABSTRACT

A roof panel module for a vehicle that includes a frame of the roof panel module connectable to a vehicle. The frame includes an opening that extends between an inside surface and outside surface of the frame. The frame further includes an inner piece having a plurality of inner flanges and an outside piece having a plurality of outside flanges which allows bonding of one of the plurality of inner flanges to one of the plurality of outer flanges. The roof panel module further includes a window extending across the opening on the outside surface of the frame that provides a viewing surface through a roof panel module of a vehicle. Connected to the frame is a light emission unit positioned within the opening of the frame. The light emission unit selectively emits light away from the inside surface of the frame and selectively emits light away from the outside surface of the frame.

27 Claims, 5 Drawing Sheets

(56) References Cited

U.S. PATENT DOCUMENTS

| | | | |
|---|---|---|---|
| 2014/0254186 A1* | 9/2014 | Terai | B60Q 1/304 |
| | | | 362/487 |
| 2019/0299566 A1* | 10/2019 | Berard | B32B 17/10036 |
| 2021/0024139 A1* | 1/2021 | Tsutsumi | B60S 1/58 |

* cited by examiner

ROOF PANEL HAVING BIDIRECTIONAL LED FILMS

FIELD OF THE INVENTION

The present invention relates to a roof panel module with a window and a light emission unit that emits light bidirectionally through the window.

BACKGROUND OF THE INVENTION

Certain types of vehicles include removable roof panels. These panels can be removed to expose the occupants to the outside elements and give an open air feel. Often vehicles with removable roof panels the panels themselves do not have any features and instead are solid pieces. As a result, the roof panel does not have any windows or lighting. It is desirable to provide a removable roof panel that has a window. It is further desirable to provide a roof panel that provides general communication, lighting and hazard warning features.

SUMMARY OF THE INVENTION

A roof panel module for a vehicle that includes a frame of the roof panel module connectable to a vehicle. The frame includes connections that allow the roof panel module to be releasably connected to the vehicle and serve as a portion of the roof structure of the vehicle, while also being a free-standing module when removed from the vehicle. The frame includes an opening formed in the frame that extends between an inside surface of the frame and an outside surface of the frame. The frame includes an inner piece having a plurality of inner flanges and an outside piece having a plurality of outside flanges which allows bonding of one of the plurality of inner flanges to one of the plurality of outer flanges. The roof panel module further includes a window extending across the opening on the outside surface of the frame and provides a viewing surface through a roof panel module of the vehicle. Connected to the frame is a light emission unit positioned within the opening of the frame. The light emission unit selectively emits light away from the inside surface of the frame and selectively emits light away from the outside surface of the frame.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 3:
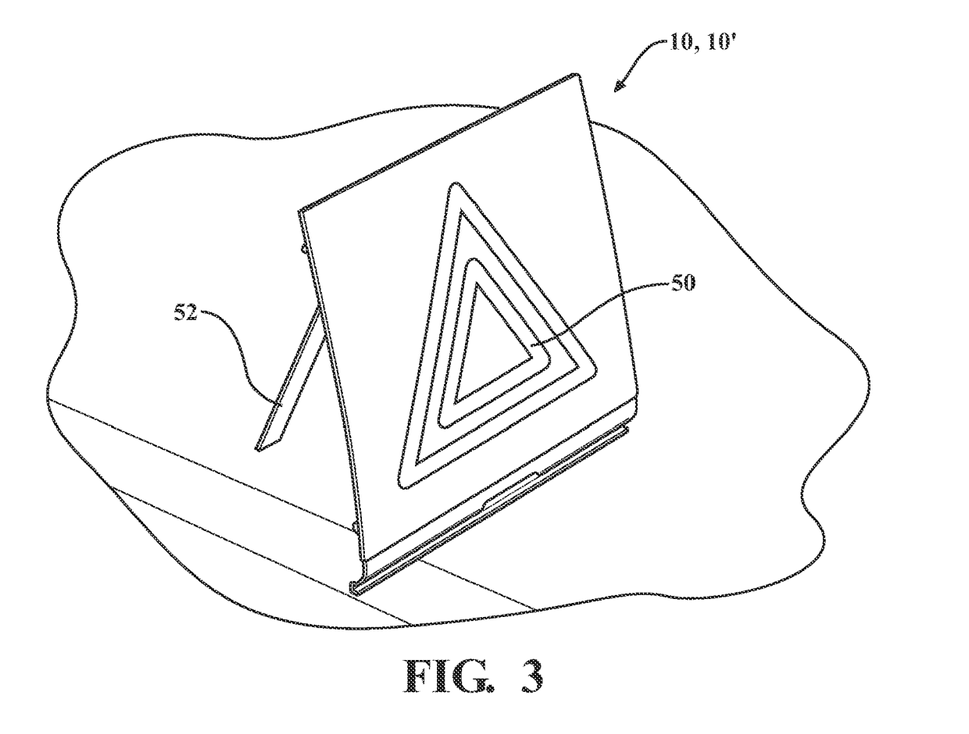
FIG. 3 is a side perspective environmental view of the roof panel module used as a hazard sign according to one embodiment of the invention.
Figure 4:
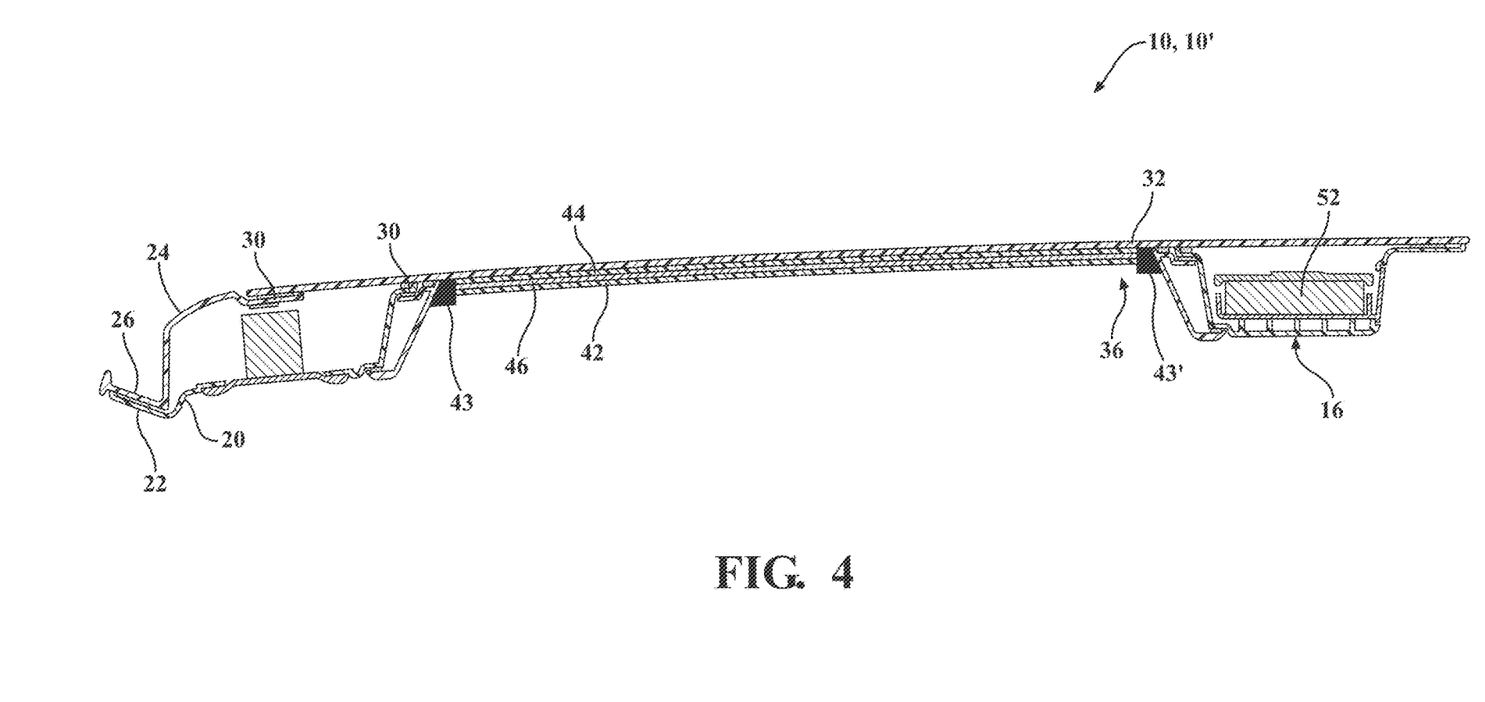
FIG. 4 is an elevational cross-sectional view of the roof panel module.
Figure 5:
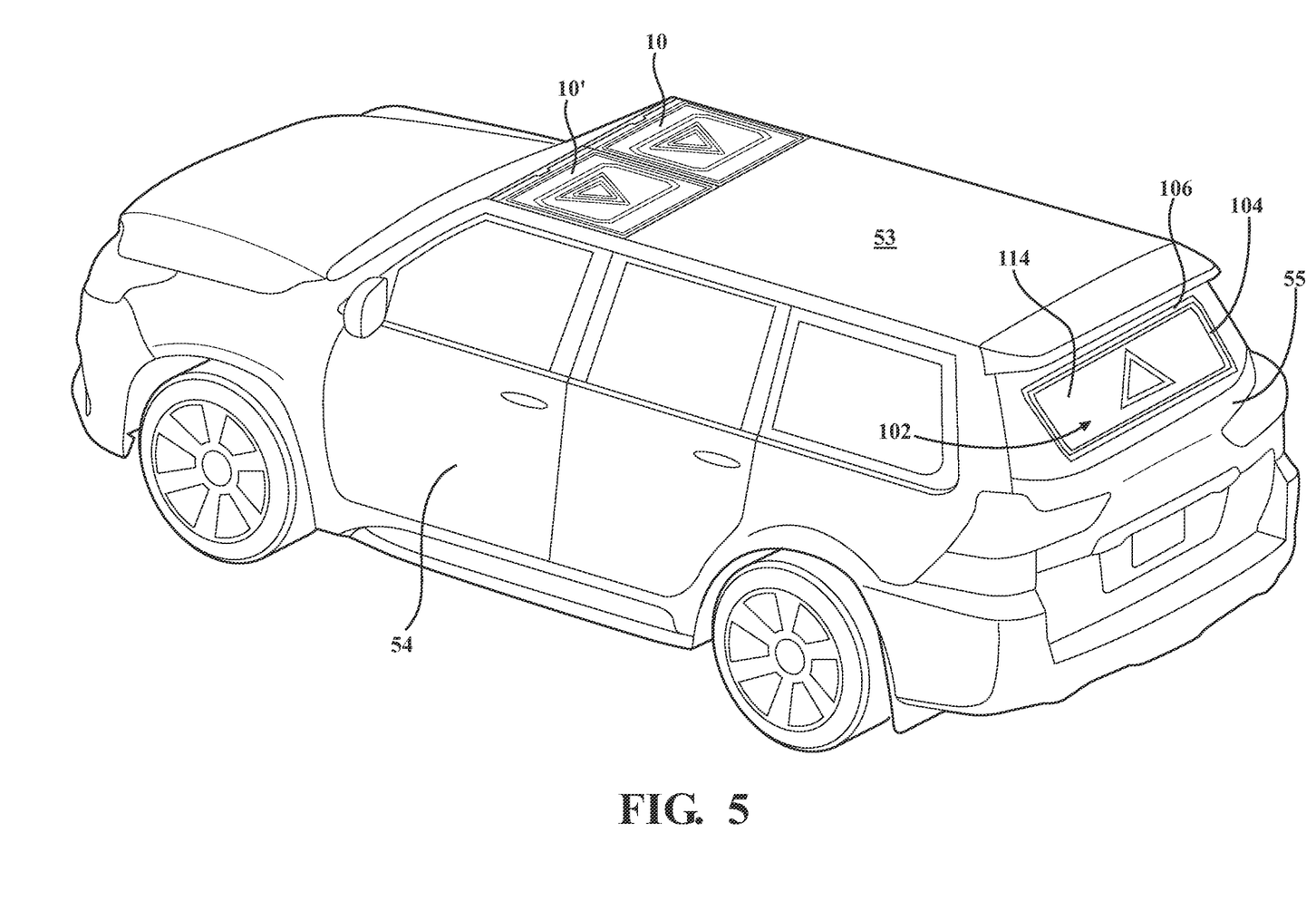
FIG. 5 is a top perspective side view of a vehicle having two roof panel modules connected to the roof of the vehicle.

Referring now to FIGS. 1-5 a roof panel module 10, 10', which can be multiple roof panel modules as shown in FIG. 5, connects to a roof 53 of a vehicle 54. Each roof panel module 10, 10' includes a frame 12 of the roof panel module 10, 10' that is removably connected to cover an opening in the roof 53 of the vehicle 54. FIG. 5 also shows a laminated panel arrangement 100 that is part of a rear window of a liftgate 55 of the vehicle 54. The laminated panel arrangement 100 is selectively illuminated to illuminate a indicia 102, which can be a symbol, message or any desired pattern of light. Also shown is a light ring 104, which is a layer of laminate material that can function as a utility light to project light onto the ground or rearward. Also, the light ring 104 can be a stop light that alerts drivers that the vehicle 54 is stopping, thereby enhancing or eliminating the need for a center high mounted stop lamp. The details of the construction of the laminated panel arrangement 100 are discussed with regard to FIG. 6 below. The details of each roof panel module 10, 10' are shown in FIGS. 1-4, which will now be described below. The frame 12 includes connections 40*a*, 40*b*, 40*c*, 40*d* that allow the roof panel module 10, 10' to be releasably connected to the vehicle 54. The connections 40*a*, 40*b*, 40*c*, 40*d* can take many forms, but in the embodiment of the invention shown in FIG. 1, the connections 40*a*, 40*b*, 40*c*, 40*d* are rotatable latches that lock onto portions of the roof 53 of the vehicle 54.

Figure 1:
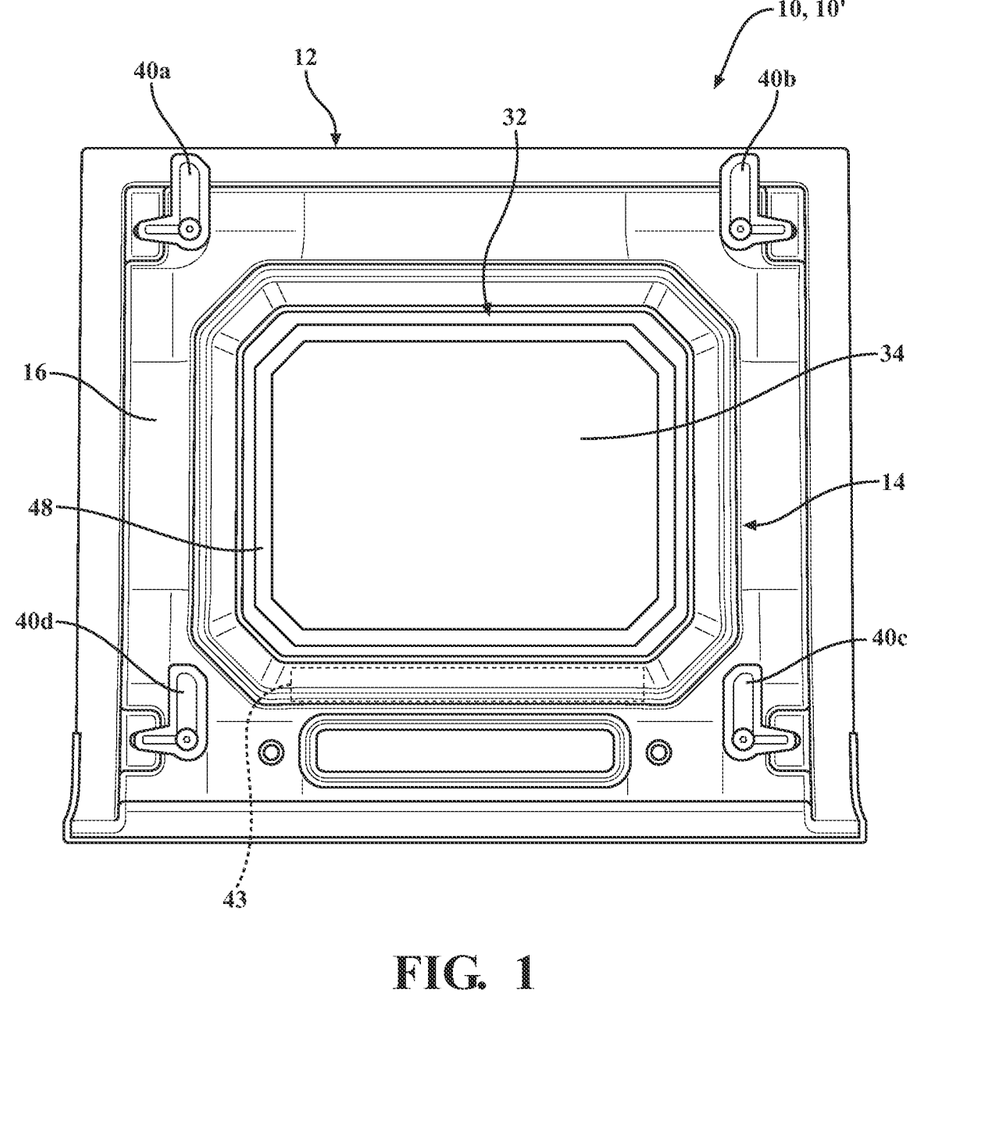
FIG. 1 is a bottom plan view of the roof panel module as viewed from the inside surface of the roof panel module.
Figure 2:
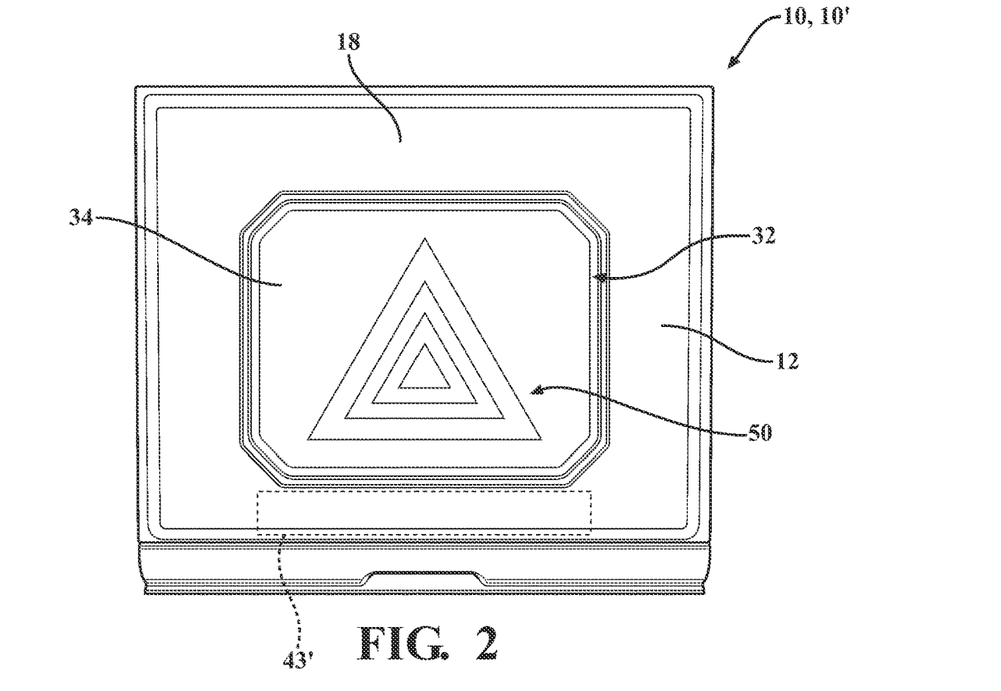
FIG. 2 is a top plan view of the roof panel module as viewed from the outside surface of the roof panel module.

The frame 12 further includes an opening 14 formed in the frame 12 that extends between an inside surface 16 of the frame 12 and an outside surface 18 of the frame 12. The frame 12 further includes an inner piece 20 having a plurality of inner flanges 22 and an outside piece 24 having a plurality of outside flanges 26 which allow bonding of one of the plurality of inner flanges 22 to one of the plurality of outer flanges 26. The roof panel module 10, 10' further includes a window 32 extending across the opening 14 on the outside surface 18 of the frame 12 that provides a viewing surface 34 through the roof panel module 10, 10'. The window 32 is connected to the outside surface 18 at window flanges 30 formed on the outer piece 24 of the frame 12.

Connected to the frame 12 is a light emission unit 36 positioned within the opening 14 of the frame 12. The light emission unit 36 selectively emits light away from the inside surface 16 and the outside surface 18 of the frame 12, which can be accomplished by using a bi-directional light source, such as a bi-directional liquid crystal display (LCD), light emitting diode (LED), organic light emitting diode (OLED) or other suitable lighting device. Referring now to FIG. 4 the details of the light emission unit 36 according to one embodiment of the present invention is shown. The light emission unit 36 has an inner light guide 42, an outer light guide 44 and a tinted layer 46, which is optional and is positioned between the inner light guide 42 and outer light guide 44. The tinted layer 46 tints or darkens the light passing through the viewing surface 34. The inner light guide 42 and outer light guide 44 are optically connected to and selectively receive light from a light source 43, 43', which can be an LED, OLED, incandescent bulb or other suitable light source. It is within the scope of the invention for the inner light guide 42 and the outer light guide 44 to be connected to separate light sources, so that they can be independently illuminated. It is also within the scope of the invention for a single light source to be used, but with the inner light guide 42 and the outer light guide 44 being able to be separately or simultaneously illuminated. The inner light guide 42 and outer light guide 44 can be a light pipe connected to the respective light source 43, 43' or they can be a reflector that redirects light from the light source 43, 43'.

When the inner light guide 42 is illuminated light emits from an inside light pattern 48 that projects light away from the inside surface 16 of the frame 12, as shown in FIG. 1. The inside light pattern 48 shown is a ring that goes around the perimeter of the viewing surface 34 of the window 32 as viewed from the inside surface 16 of the frame 12. While a ring is shown it is within the scope of this invention for the inside light pattern 48 to take other forms or shapes depending on the needs of a particular application. In the present embodiment of the invention the inside light pattern 48 does not obstruct the view through the viewing surface 34 of the window 32.

When the outside light guide 44 is illuminated a graphic 50, that is placed within or adjacent to the outside light guide 44, is illuminated and is visible from the viewing surface 34. Light from the outside light guide 44 and the graphic 50 projects away from the outside surface 18 of the frame 12. The graphic 50 can have any type of shape or message. FIG. 3 shows an illustration of an embodiment where the roof panel module 10, 10' has been removed from the roof 53 of the vehicle 54 and is placed on the ground standing vertically on an edge using a stand 52. The stand 52 can be a built-in rod or a separate support connected to the inside surface 16 of the frame 12. In the present embodiment of the invention the roof panel module 10, 10' is functioning as a road hazard sign with the outer light guide 44 illuminating the graphic 50 in order to alert surrounding vehicles of a hazard.

Illumination of the inner light guide 42 or outer light guide 44 is powered by a wired connection to the vehicle 54. Also, the roof panel module 10, 10' includes a portable power source 52 that is a rechargeable battery that is charged by onboard power from the vehicle 54, or by an optional solar panel that maintains the power in the portable power source 52. This way the inner light guide 42 and outer light guide 44 can be illuminated when the roof panel module 10, 10' is disconnected from the vehicle.

Figure 6:
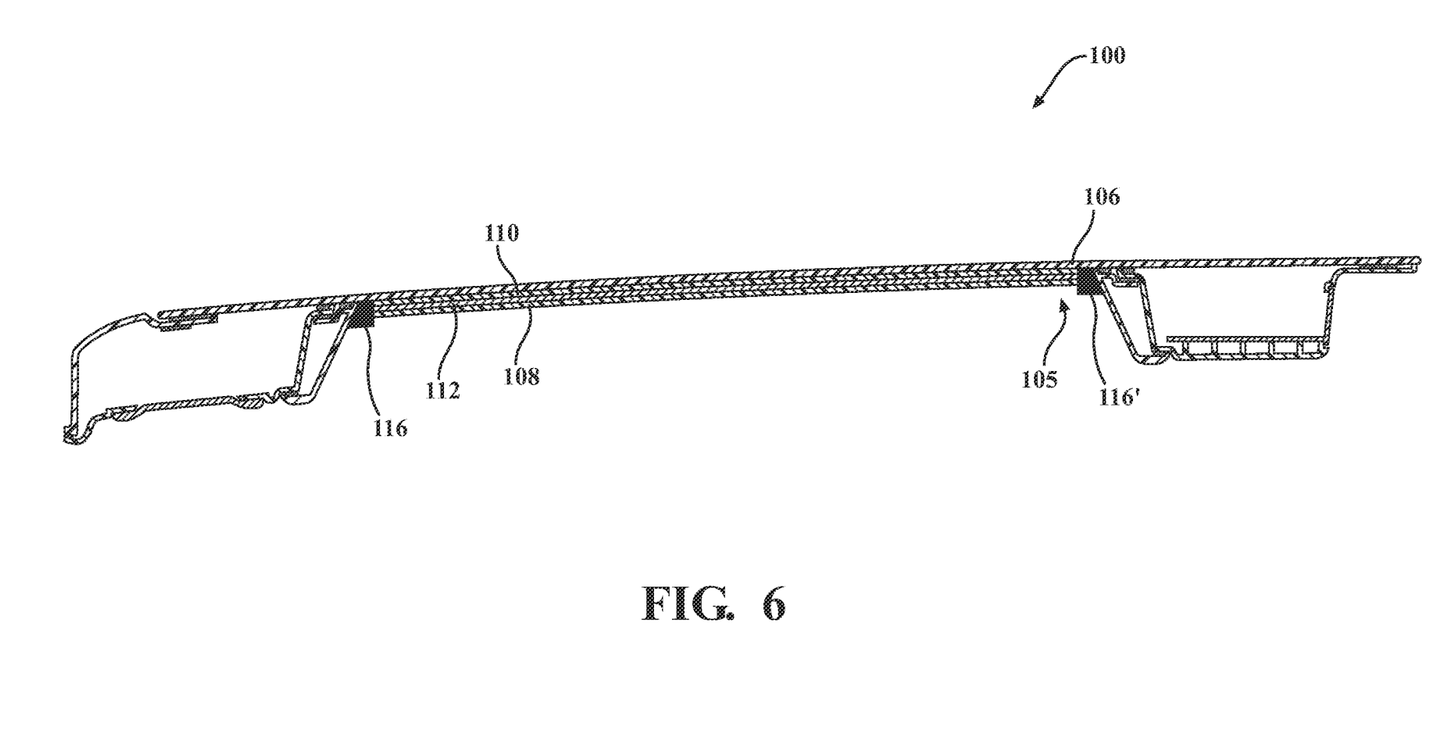
FIG. 6 is an elevational cross-sectional view of a laminate panel arrangement.

Referring now to FIGS. 1 and 6 the details of the laminated panel arrangement 100 according to one embodiment of the present invention is shown. The laminated panel arrangement 100 also includes structures shown in FIG. 5. The laminated panel arrangement 100 consists of layers of materials laminated onto a surface. In the present application the layers of materials that are part of a light emission unit 105 laminated to a rear window 106 of a lift gate 55, however, it is within the scope of the invention for the laminated panel arrangement 100 to be part of any window on a vehicle including a side door windows, rear quarter panel windows, etc. The laminated panel arrangement 100 is formed by connecting several layers of materials (i.e., a laminated structure) to a window, which can be formed of glass or polymer. The light emission unit 105 has an inner light guide 108, an outer light guide 110 and a tinted layer 112, which is optional and is positioned between the inner light guide 108 and outer light guide 112. The tinted layer 112 tints or darkens the light passing through a viewing surface 114 of the window 106. The inner light guide 108 and outer light guide 110 are optically connected to and selectively receive light from a light source 116, 116', which can be an LED, OLED, incandescent bulb or other suitable light source for projecting light into one or both of the inner light guide 108 or outer light guide 110. It is within the scope of the invention for the inner light guide 108 and the outer light guide 110 to be connected to separate light sources, so that they can be independently illuminated. It is also within the scope of the invention for a single light source to be used, but with the inner light guide 108 and the outer light guide 110 being able to be separately or simultaneously illuminated. The inner light guide 108 and outer light guide 110 is a light pipe connected to the respective light source 116, 116' or they can be a reflector that redirects light from the light source 116, 116'. Light entering the outer light guide 110 can be directed to illuminate the indicia 102, light ring 104 or both the indicia 102 and light ring 104 simultaneously. Light entering the inner light guide 108 is used to provide illumination to the interior surface of the vehicle 53. In the present embodiment of the invention, it is contemplated that the light entering the inner light guide 108 illuminates an interior facing surface of the light ring 104, but light is projected from the inner light guide 108 toward the interior surface of the vehicle 53 only.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof panel module for a vehicle comprising:
a frame of the roof panel module connectable to a vehicle, the frame includes an opening formed in the frame extending between an inside surface of the frame and an outside surface of the frame;
a window extending across the opening on the outside surface of the frame wherein the window provides a viewing surface through the roof panel module of a vehicle and;
a light emission unit connected to the frame and positioned within the opening of the frame, wherein the light emission unit selectively emits light away from the inside surface of the frame and selectively emits light away from the outside surface of the frame
wherein the light emission unit further includes an inside light guide that emits light around a portion of the opening of the frame, away from the inside surface of the frame.

2. The roof panel module of claim 1, wherein the frame has at least one connection portion for securing the roof panel module to the vehicle.

3. The roof panel module of claim 1, wherein the frame has an inside surface portion that is connected to an outside surface portion.

4. The roof panel module of claim 1, wherein the window is transparent and allows ambient light from outside the vehicle to pass through the viewing surface of the window.

5. A roof panel module for a vehicle comprising:
a frame of the roof panel module connectable to a vehicle, the frame includes an opening formed in the frame extending between an inside surface of the frame and an outside surface of the frame;

a window extending across the opening on the outside surface of the frame wherein the window provides a viewing surface through the roof panel module of a vehicle; and a light emission unit connected to the frame and positioned within the opening of the frame, wherein the light emission unit selectively emits light away from the inside surface of the frame and selectively emits light away from the outside surface of the frame, wherein the light emission unit further includes an outside light guide that emits light around a portion of the opening of the frame, away from the outside surface of the frame.

6. The roof panel module of claim 5 further comprising a graphic operably connected to the outside light guide that is illuminated by the outside light guide and is visible when the window is viewed from the outside surface of frame.

7. The roof panel module of claim 6 further comprising a stand connectable to the inside surface of the frame for holding the roof panel module vertically on the ground so that the graphic is visible.

8. The roof panel module of claim 7 further comprising a portable power source for selectively illuminating the outside light guide.

9. A roof panel module for a vehicle comprising:
a frame of the roof panel module connectable to a vehicle, the frame includes an opening formed in the frame extending between an inside surface of the frame and an outside surface of the frame;
a window extending across the opening on the outside surface of the frame wherein the window provides a viewing surface through the roof panel module of a vehicle;
a light emission unit connected to the frame and positioned within the opening of the frame, wherein the light emission unit selectively emits light away from the inside surface of the frame and selectively emits light away from the outside surface of the frame, wherein the light emission unit further comprises:
an inside light guide that emits light around a portion of the opening of the frame, away from the inside surface of the frame;
an outside light guide that emits light around a portion of the opening of the frame, away from the outside surface of the frame; and
at least one light source connected to both the inside light guide and the outside light guide.

10. The roof panel module of claim 9 further comprising a tinted layer between the inside light guide and the outside light guide and extending across the viewing surface.

11. The roof panel module of claim 9 further comprising a graphic operably connected to the outside light guide that is illuminated by the outside light guide and is visible when the window is viewed from the outside surface of frame.

12. The roof panel module of claim 11 further comprising a stand connectable to the inside surface of the frame for holding the roof panel module vertically on the ground so that the graphic is visible.

13. The roof panel module of claim 12 further comprising a portable power source for selectively illuminating the inside light guide and selectively illuminating the outside light guide.

14. A roof panel module for a vehicle comprising:
a frame of the roof panel module connectable to a vehicle, said frame includes an opening formed in the frame extending between an inside surface of the frame and an outside surface of the frame, wherein the frame includes an inner piece having a plurality of inner flanges and an outside piece having a plurality of outside flanges, wherein one of the plurality of inner flanges is bonded to one of the plurality of outside flanges;
a window extending across the opening on the outside surface of the frame wherein the window provides a viewing surface through the roof panel module of a vehicle; and
a light emission unit connected to the frame and positioned within the opening of the frame, wherein the light emission unit selectively emits light away from the inside surface of the frame and selectively emits light away from the outside surface of the frame.

15. The roof panel module of claim 14, wherein the frame has at least one connection portion for securing the roof panel module to the vehicle.

16. The roof panel module of claim 14, wherein the frame has an inside surface portion that is connected to an outside surface portion.

17. The roof panel module of claim 14, wherein the window is transparent and allows ambient light from outside the vehicle to pass through the viewing surface of the window.

18. The roof panel module of claim 14, wherein the light emission unit further includes an inside light guide that emits light around a portion of the opening of the frame, away from the inside surface of the frame.

19. The roof panel module of claim 14, wherein the light emission unit further includes an outside light guide that emits light around a portion of the opening of the frame, away from the outside surface of the frame.

20. The roof panel module of claim 19 further comprising a graphic operably connected to the outside light guide that is illuminated by the outside light guide and is visible when the window is viewed from the outside surface of frame.

21. The roof panel module of claim 20 further comprising a stand connectable to the inside surface of the frame for holding the roof panel module vertically on the ground so that the graphic is visible.

22. The roof panel module of claim 21 further comprising a portable power source for selectively illuminating the outside light guide.

23. The roof panel module of claim 22, wherein the light emission unit further comprises:
an inside light guide that emits light around a portion of the opening of the frame, away from the inside surface of the frame;
an outside light guide that emits light around a portion of the opening of the frame, away from the outside surface of the frame; and
at least one light source connected to both the inside light guide and the outside light guide.

24. The roof panel module of claim 23 further comprising a tinted layer between the inside light guide and the outside light guide and extending across the viewing surface.

25. The roof panel module of claim 23 further comprising a graphic operably connected to the outside light guide that is illuminated by the outside light guide and is visible when the window is viewed from the outside surface of frame.

26. The roof panel module of claim 25 further comprising a stand connectable to the inside surface of the frame for holding the roof panel module vertically on the ground so that the graphic is visible.

27. The roof panel module of claim 26 further comprising a portable power source for selectively illuminating the inside light guide and selectively illuminating the outside light guide.

\* \* \* \* \*